United States Patent [19]
Robert

[11] Patent Number: 5,514,040
[45] Date of Patent: May 7, 1996

[54] VARIABLE-SPEED BELT DRIVE HAVING TOOTHED FLYWEIGHTS

[75] Inventor: Jean Robert, Drummondville, Canada

[73] Assignee: Powerbloc IBC Canada Inc., Quebec, Canada

[21] Appl. No.: 211,329

[22] PCT Filed: Sep. 25, 1992

[86] PCT No.: PCT/CA92/00421

§ 371 Date: May 19, 1994

§ 102(e) Date: May 19, 1994

[87] PCT Pub. No.: WO93/06388

PCT Pub. Date: Apr. 1, 1993

[30] Foreign Application Priority Data

Sep. 27, 1991 [CA] Canada .................. 2052356

[51] Int. Cl.⁶ .................................. F16H 59/00
[52] U.S. Cl. .......................... 474/13; 74/336 B
[58] Field of Search .................. 474/13, 14, 21; 74/61, 336.5, 336 B; 475/16, 186; 173/49; 209/367

[56] References Cited

U.S. PATENT DOCUMENTS

| | | |
|---|---|---|
| 3,395,587 | 8/1968 | Casini . |
| 3,638,744 | 2/1972 | Washizawa .............. 474/14 X |
| 3,685,366 | 8/1972 | Schupan .................. 474/13 |
| 4,800,768 | 1/1989 | Kazuta ................... 475/16 X |

FOREIGN PATENT DOCUMENTS

| | | |
|---|---|---|
| 1212559 | 10/1986 | Canada . |
| 251756 | 1/1988 | European Pat. Off. . |
| 1073260 | 9/1954 | France . |
| 10852 | 2/1981 | Japan ................... 474/13 |
| 39868 | 3/1983 | Japan ................... 474/13 |
| 110056 | 5/1987 | Japan ................... 474/13 |
| 110057 | 5/1987 | Japan ................... 474/13 |
| 240436 | 9/1990 | Japan ................... 474/13 |

*Primary Examiner*—Roger J. Schoeppel
*Attorney, Agent, or Firm*—Collard & Roe

[57] ABSTRACT

A pulley mounted at the output of a drive shaft is used in a variable-speed belt drive in which pairs of generally cylindrical toothed flyweights engage toothed racks in order to vary the winding diameter of the pulley by varying the centrifugal force. A V-belt is placed around the pulley. As a result of using the pulley, a more accurate adjustment of the diameter is achieved, maximum engine power is maintained under conditions of severe loading, and the response time of the diameter varying system is reduced in the case of an abrupt load change.

3 Claims, 2 Drawing Sheets

VARIABLE-SPEED BELT DRIVE HAVING TOOTHED FLYWEIGHTS

The present invention relates to a pulley located at the end of an engine-driven shaft, in which pairs of flyweights having a substantially cylindrical shape engage toothed racks in order to vary, under the influence of the centrifugal force, the winding diameter of the pulley around which is winded a trapezoidal belt. This pulley, called driving pulley, is part of a type of drive called variable-speed belt drive. In addition to the driving pulley described hereinafter, the drive comprises another pulley, called driven pulley, on which is winded the other end of the belt. The driven pulley is designed in a way that the winding diameter varies in reverse of the driving pulley, the belt having a fixed length. This type of drive is used particularly in vehicles such as snowmobiles, motorcycles, all-terrain vehicles or some small automobiles.

The object for varying the winding diameter of the pulleys is to have a diameter ratio allowing an important torque during the acceleration of the vehicle and a reasonable engine rotation speed at high speeds. If the engine rotation speed is low or if the load is high, the driving pulley has a small winding diameter and it increases as the engine rotation speed increases or as the load becomes smaller. On the other hand, the pulley has to reduce its winding diameter when the engine rotation speed decreases or if the required torque is increasing.

In a traditional type of variable-grooved pulley, flyweights sliding along smooth walls are used for allowing the winding diameter of the pulley to vary. The pulley usually has two flanges, one called fixed flange and the other called movable flange, which are mounted around a shaft. The axial movement of the movable flange is made by sets of flyweights which are resting against two inclined walls, the first being solid with the movable flange and the other being solid with an end member provided on the shaft, at the end opposed to the fixed flange.

When the shaft of the pulley is in rotation, it brings the fixed flange into rotation along with the end member. This end member transmits its rotation motion with the side walls of a guide located between the end member and the movable flange, to the flyweights which then move, with the side walls of the guide of the movable flange, the movable flange. Additionally, since they are rotated, the flyweights are subjected to centrifugal forces and, deplacing radially, take respectively contact on the two ramps of the movable and the end member. Because of their trapezoidal shape, they produce an axial push on the movable flange which then slides towards the fixed flange. For a given rotation speed of the pulley, an equilibrium is reached when the axial push is counter-balanced by a first axial return force, exerted by a return spring mounted between the movable flange and a shoulder of the shaft, and by a second return force which is the axial component of the pressure exerted by the belt. Following this equilibrium, the belt with a trapezoidal cross-section has a changing winding diameter taking a value more or less important according to the rotation speed of the pulley.

An example of a driving pulley of the type mentioned hereinabove is described in Canadian patent No. 1,212,559.

In dynamics, when the rotation speed is increasing, the centrifugal force on the flyweights is increasing proportionally. Their axial push on the ramps is also increasing and the equilibrium is shifted towards a closeness of the two flanges. The winding diameter is then increased. Additionally, when the rotation speed decreases, the axial push of the flyweights decreases and the equilibrium is shifted towards a distancing of the two flanges. The winding diameter is then decreased.

The movement of the movable flange being generated by the sliding of the flyweights along the contact walls, the axial push is modified by the friction between the flyweights and the contact walls. When the vehicle is in an accelerating phase, the friction is tending to reduce the axial push which becomes inferior to the desired value. When the speed decreases because of an instant overload, the friction is tending to increase the axial push which becomes superior to the desired value. The ratio between the rotation speed of the engine and the driven pulley will then be different from the desired value, causing a decrease in performance.

For resolving the above-mentioned problem, the present invention suggests to replace the flyweights sliding along contact walls with sets of pair of flyweights rolling on toothed racks attached to the contact walls for considerably reducing the friction which modifies the speed ratios.

The present invention is then providing a pulley for a variable-speed belt drive comprising two coaxial flanges provided with conical walls facing each other for forming between them a V-shaped groove in which is placed a belt having a trapezoidal cross-section, one of the flanges, called fixed flange, being rigidly attached to one of the ends of a shaft, the other flange, called movable flange, being mounted on the shaft with a slide for freely sliding along the shaft. A helicoidal spring, mounted around the shaft, allows to apply a return force for moving away the movable flange from the fixed flange. An end member being fixed at the other end of the shaft for being in a face-to-face relationship with the movable flange.

At least two sets of flyweights are distributed radially and symmetrically around the shaft between the end member and the movable flange. Each set comprises two flyweights having a generally cylindrical shape extending in a same radial plane with reference to the shaft, the flyweights being toothed and meshed together. A guide is used for maintaining the two flyweights in the radial plane while allowing displacement thereof. Two inclined racks having teeth identical to the ones of the flyweights are set in a face-to-face relationship in the radial plane. One of the two racks is rigidly fixed to the end member and the other to the movable flange so that the distance between them is smaller as moving away from the shaft. Those two racks are meshed to a corresponding flyweight which, under the effect of the centrifugal force generated when the pulley is in rotation, is radially moving away from the shaft by rolling not only on each other, but also along the racks. The displacement of the flyweights urges the movable flange to move along the shaft for getting closer to the fixed flange. The closing up of the two flanges is however controlled by the return force of the helicoidal spring and also by the return force of the axial component coming from the pressure exerted by the belt, these forces balancing the push of the flyweights on the movable flange and moving the two flanges away from each other as soon as the rotation speed of the pulley decreases.

It is possible to obtain a complex movement of the movable flange in function of the rotation speed by combining the different types of flyweights and racks. The flyweights may be essentially cyclindrical or having a cam-like shape, more particularly an oval shape. They may have a central unaligned or not with reference to the center of gravity. The racks may be straight or curved, the term "curved" referring to a surface having one or many radius of curvature. Moreover, the flyweights of a same set are not necessary symmetrical. Each rack may also have a shape distinct from the other.

The advantages of this new pulley are:

a more accurate tuning of the pulley;

the upholding of the power of the engine at its maximum under very high loads;

the combination of the simplicity and the durability of the principles of flyweights with the low friction characteristic of the sets of toothed flyweights rolling along racks; and the reduction of the reaction time of the pulley upon an abrupt change in the load for reducing the time where the engine rotation speed is lower than its optimum value.

The invention will be better understood with the following non restrictive description of a preferred embodiment given with reference to the appended drawings in which.

Figure 1:
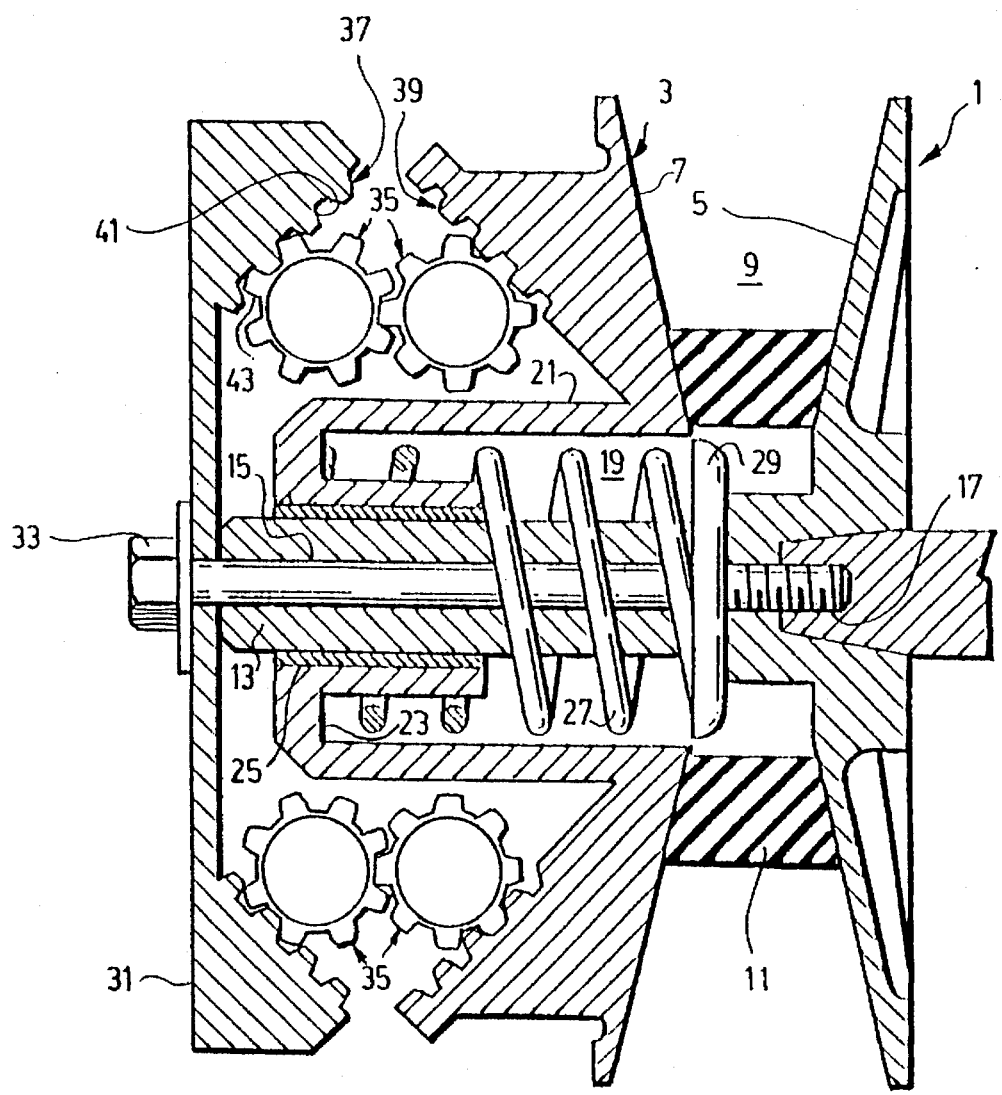
FIG. 1 is a cross-sectional view of driving pulley according to the invention.

The pulley according to the invention, as shown in FIG. 1, is the driving pulley of a variable-speed belt drive. The pulley comprises two coaxial flanges 1 and 3 having respectively conical walls 5 and 7 facing each other and forming a V-shaped groove 9 for receiving a trapezoidal belt 11 which transmits torque to a driven pulley (not shown).

The flange 1, called fixed flange, is rigidly attached at one end of a shaft 13 having an axial hole 15 for receiving a bolt 17. The flange 3, called movable flange, has a hole 19 in its center against which a cylinder is provided. The cylinder 21 has a bottom 23 on which is fixed a slide 25 allowing the movable flange 3 to slide along the shaft 13.

A helical spring 27, having the function of generating a return force urging the movable flange 3 to move away from the fixed flange 1, is set around the shaft and rests on the bottom 23 of the cylinder 21, and against the fixed flange 1 by means of a stop 29. The spring 27 may however be set differently. An end member 31 is rigidly attached at the end of the shaft 13 opposite to the fixed flange 1. The end member 31 is fixed by the head 33 of the bolt 17.

Preferably, three sets of flyweights are radially and symmetrically disposed around the shaft 13. It is however possible to have a different number of sets of flyweights, such as two, four or even more. Each set comprises a pair of cylindrical and toothed flyweights 35, and two racks 37 and 39, which are straight and symmetrical. The rack 37 is fixed on the end member 31 and the other, the rack 39, is fixed on the movable flange 3. The racks 37 and 39 have tooth 41 identical to the tooth 43 of the flyweights 35. It should be noted that the flyweights 35 may have another shape than cylindrical and that the racks may be curved. Additionally, the flyweights 35 may be identical or different from one another. The racks 37 and 39 may further have or not an identical shape.

During the rotation of the pulley, the flyweights 35 are subjected to a radial centrifugal force urging the flyweights to move away from the shaft 13. Since the rack 39 is fixed to the movable flange 3, it is possible to have an increase of the distance between the racks 37 and 39, allowing therefore a radial displacement of the flyweights 35. The rack 37 do not move because it is rigidly attached to the end member 31, itself rigidly attached to the shaft 13. The centrifugal force is a massic force effective on the center of weight of the flyweights. Since they are cylindrical, the force is acting on their geometrical center. The teeth 43 of the flyweights 35 are meshed with the teeth 31 of the racks 37 and 39, the teeth 41 and 43 being identical for preventing the slip of the flyweights 35 on the walls, thus the existance of a force between the teeth 41 and 43. This force is also acting on the sides of the flyweights 35. In fact, the flyweights 35 have smooth sides that are rolling on flat ramps (not shown). Only the central part of the flyweights 35 are toothed.

The centrifugal force acting in the center of the flyweights and the existence of a force around the teeth 41 and 43 generate a rotation torque and induces a rotation of the flyweights 35 if the space between the racks 37 and 39 increase, thus moving the movable flange 3. The rotation of the flyweights 35 is ended when the equilibrium between the centrifugal force of the flyweights 35 and the combined return force of the spring 27 and of the belt 11, is reached. If the rotation speed increases again, the flyweights 35 are subjected to an increasing centrifugal force, thereby forcing the spring 27 to be further compressed, the movable flange 3 being brought closer to the fixed flange 1. If the rotation speed decreases, the biasing force of the spring 27 becomes greater than the effect of the centrifugal force, thereby forcing the movable flange 3 away from the fixed flange 1 and also moves the rack 39. The movement of the rack 39 towards the rack 37 is forcing the flyweights 35 to move towards the central axis of the shaft 13 until the equilibrium is reached following the release of the spring 27 and the loosening of the belt 11.

Figure 2:
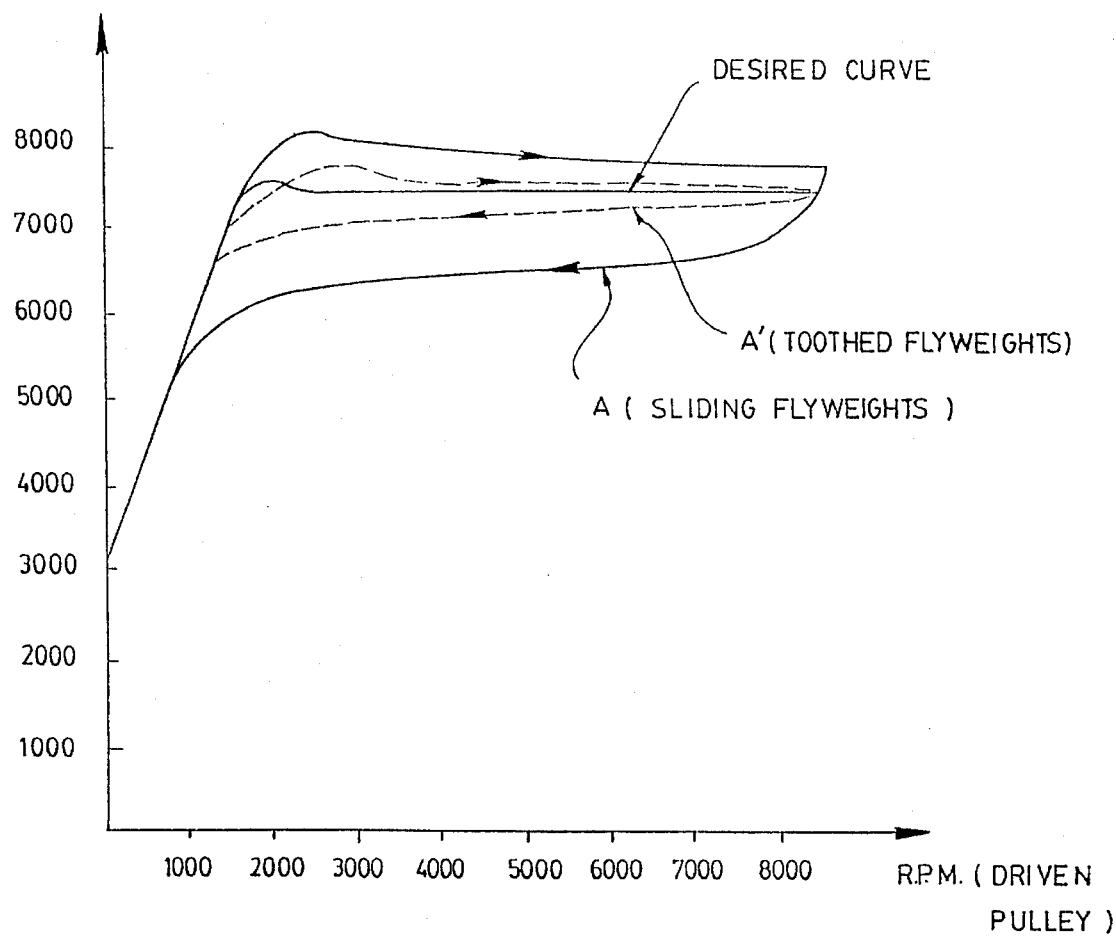
FIG. 2 is a graph of the rotation speed of the driving pulley in function a the rotation speed of the driven pulley.

It is possible to see in the graph of FIG. 2, showing the rotation speed of the driving pulley in function of the rotation speed of the driven pulley, in rotation per minutes, that the resulting curve of the toothed flyweights is closer to the desired curve than the one using the sliding flyweights. It is thus likely that the use of toothed flyweights gives superior results about power transmission than the previous drives.

What is claimed is:

1. A driving pulley in a variable-speed belt drive comprising:

a shaft having two ends;

two coaxial flanges having corresponding conical walls facing each other and forming a V-shaped groove for receiving a trapezoidal belt, one of the flanges being a fixed flange rigidly attached at one end of the shaft, and the other flange being a movable flange slidably mounted on the shaft by means of a slide for freely sliding along the shaft;

a helical spring mounted around the shaft for applying a return force urging the movable flange away from the fixed flange;

an end member rigidly attached at the other end of the shaft opposed to the fixed flange, the end member facing the movable flange;

the pulley being characterized in comprising at least two sets of flyweights symmetrically disposed between the end member and the fixed flange, the sets being radially disposed around the shaft and each set comprising:

two substantially cylindrical flyweights each having a separate axis which axes are perpendicular to a common transverse plane passing through the centerline of the shaft, the flyweights being toothed and meshed with each other;

two inclined and radially converging toothed racks having teeth identical to the ones of the flyweights and facing each other, one of the racks being rigidly attached to the end member and the other to the movable flange, the racks being disposed in the transverse plane so that they are meshed with one of the flyweights which, under the effect of a centrifugal force generated when the pulley is in rotation, the flyweights are radially moved away from the shaft by rolling not only on each other but also along the racks and by forcing the movable flange to be moved along the shaft for getting closer to the fixed flange, the closing up being controlled by at least one helical spring which balances a push of the flyweights on the movable flange and moves away the two flanges as soon as a rotation speed of the pulley decreases.

2. A pulley according to claim 1, wherein flyweights of a same set are identical.

3. A driving pulley in a variable-speed belt drive comprising:

a shaft having two ends;

two coaxial flanges having corresponding conical walls facing each other and forming a V-shaped groove for receiving a trapezoidal belt, one of the flanges being a fixed flange rigidly attached at one end of the shaft, and the other flange being a movable flange slidably mounted on the shaft by means of a slide for freely sliding along the shaft;

a helical spring mounted around the shaft for applying a return force urging the movable flange away from the fixed flange;

an end member rigidly attached at the other end of the shaft opposed to the fixed flange, the end member facing the movable flange;

the pulley being characterized in comprising at least two sets of flyweights symmetrically disposed between the end member and the fixed flange, the sets being radially disposed around the shaft and each set comprising:

two substantially cylindrical flyweights each having a separate axis which axes are perpendicular to a common transverse plane passing through the centerline of the shaft, the flyweights being toothed and meshed with each other;

two inclined and radially converging toothed racks having teeth identical to the ones of the flyweights and facing each other, one of the racks being rigidly attached to the end member and the other to the movable flange, the racks being disposed in the transverse plane so that they are meshed with one of the flyweights which, under the effect of a centrifugal force generated when the pulley is in rotation, the flyweights are radially moved away from the shaft by rolling not only on each other but also along the racks and by forcing the movable flange to be moved along the shaft for getting closer to the fixed flange, the closing up being controlled by at least one helical spring which balances a push of the flyweights on the movable flange and moves away the two flanges as soon as a rotation speed of the pulley decreases; and wherein said toothed racks move away from each other as the flyweights move further away from the shaft.

* * * * *